(12) United States Patent
Turnipseed (10) Patent No.: US 9,051,955 B2
(45) Date of Patent: Jun. 9, 2015

(54) ELEMENT MODULAR FURNITURE SYSTEM (71) Applicant: Brian Turnipseed, Denver, CO (US)

(72) Inventor: Brian Turnipseed, Denver, CO (US)

(*) Notice: Subject to any disclaimer, the term of this patent is extended or adjusted under 35 U.S.C. 154(b) by 134 days.

(21) Appl. No.: 14/037,355

(22) Filed: Sep. 25, 2013

(65) Prior Publication Data

US 2015/0086260 A1    Mar. 26, 2015

(51) Int. Cl.
*F16B 12/44* (2006.01)
*A47B 47/00* (2006.01)
*F16B 12/02* (2006.01)

(52) U.S. Cl.
CPC ............. *F16B 12/44* (2013.01); *A47B 47/0016* (2013.01); *A47B 47/0091* (2013.01); *F16B 12/02* (2013.01)

(58) Field of Classification Search
CPC .......... F16B 12/00; F16B 12/02; F16B 12/10; F16B 12/40; F16B 12/44; F16B 12/443; F16B 12/446; F16B 2001/0035; A47B 47/0016; A47B 47/0091; A47B 47/047; A47B 47/05
USPC .......... 403/DIG. 1; 312/108, 111, 140, 257.1, 312/263
See application file for complete search history.

(56) References Cited

U.S. PATENT DOCUMENTS

| 3,272,582 | A  | * | 9/1966 | Mack et al. | 312/265.4 |
| 3,835,354 | A  | * | 9/1974 | Torres-Pena | 312/265.4 |
| 6,422,292 | B1 | * | 7/2002 | Berry et al. | 160/374.1 |
| 6,588,334 | B2 | * | 7/2003 | Salisbury | 101/127.1 |
| 2007/0132345 | A1 | * | 6/2007 | Lai | 312/265.4 |
| 2012/0119629 | A1 | * | 5/2012 | Nelson et al. | 312/111 |

FOREIGN PATENT DOCUMENTS

DE    102011012197 A1 *  8/2012

* cited by examiner

*Primary Examiner* — Michael P Ferguson
*Assistant Examiner* — Jonathan Masinick (57) ABSTRACT

An element modular furniture system utilizes a plurality of base frame elements to construct modular furniture pieces. Base frame elements are usually rectangular in shape and utilize a plurality of struts. Each strut is joined to a neighboring strut with a strut connector. An outset strut connector has a protruding outset strut interlock that connects with an inset strut connector having an inset port. The interlocks utilize extremely strong magnets to draw and hold the connectors together. The struts each have one or more channel members which add strength and rigidity to the base frame elements and the furniture piece constructed therefrom. An interlocking panel may be attached to channel members to strengthen and interlock struts and/or base frame elements. Additionally, shelves, hinges, doors, shelf locks, lights, and other attachments can be connected to the channel members to enhance the functionality and appearance of the resulting furniture piece.

20 Claims, 6 Drawing Sheets

ELEMENT MODULAR FURNITURE SYSTEM

TECHNICAL FIELD

The present invention relates generally to the field of furniture, and more particularly to an element modular furniture system which provides a portable, interlocking modular system for constructing furniture pieces that can be easily assembled and disassembled as needed.

BACKGROUND

Since the first person rolled up a log next to a fire and sat down, people have been creating furniture. Today, the field of furniture encompasses everything from fold-up camping stools to elaborately carved solid wood tables. However, as our society continues to become more mobile, there is an increasing need for furniture pieces that are light, portable, multi-use, easy to set up and take down, and yet are extremely strong and stable. This is especially true in the fields of events, tradeshows, catering, party-planning, etc.

In order to address this need, a number of prior art furniture systems have been designed. Such systems often utilize standardized components that can be attached to one another using straps, bolts, or other removable fasteners. However, existing systems are often bulky, heavy, and slow, not to mention that they can be weak and unstable. What is needed is a modular system that utilizes light, easily portable components that can be connected to each other in seconds and yet provide extreme strength and stability.

DETAILED DESCRIPTION

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawings in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Figure 1A:
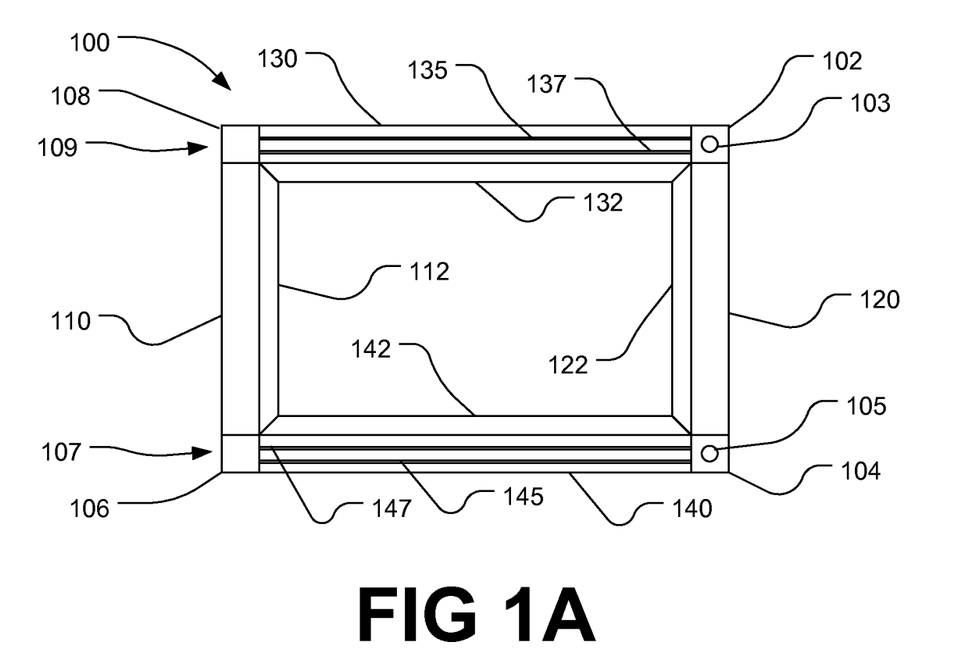
FIG. 1A illustrates a front elevation view of an exemplary embodiment of a base frame element of an element modular furniture system.
Figure 6:
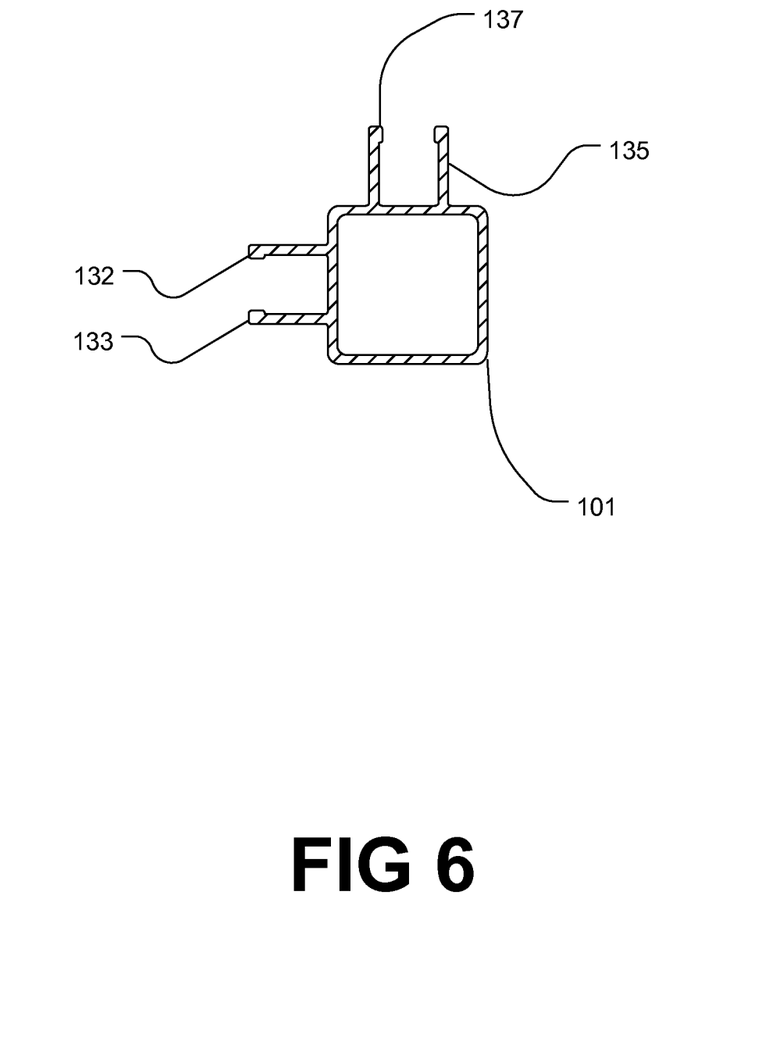
FIG. 6 illustrates a cross-section view of a frame strut component used in an element modular furniture system.

Referring now to the drawings, FIG. 1A illustrates a front elevation view of an exemplary embodiment of a base frame element 100 of an element modular furniture system. The base frame element 100 is a basic building block utilized in constructing modular furniture pieces using the described system. As such, the base frame element 100 has a number of sub-components, including an inset side strut 110, an outset side strut 120, a top strut 130 and a bottom strut 140. In the embodiment shown in FIG. 1A, the struts are generally square or four-sided in cross-section. They can be formed using a tubular construction (as shown in FIG. 6) or they can be solid. Each strut is joined to two neighboring struts in order to form the four-sided base frame element 100 illustrated in FIG. 1A: the top strut 130 is attached to outset strut 120, the outset strut is also attached to the bottom strut, the bottom strut is also attached to the inset strut, and the inset strut is also attached to the top strut.

Strut attachment can be accomplished in a number of ways. In the embodiment shown in FIG. 1A, a plurality of strut connectors 102, 104, 106, and 108 are utilized. If the struts 110, 120, 130, and 140 are solid and square in cross-section, then the strut connectors 102, 104, 106, and 108 will be cubic in shape. However, it is preferred that the strut connectors 102, 104, 106, and 108 are tubular and so the preferred strut connectors 102, 104, 106, and 108 can be "L" shaped with strut protrusions extending to turn the otherwise cubic shape into the "L" shape. The strut protrusions would then slide inside the strut tubes to form a strong connection between the struts 110, 120, 130, and 140. In another embodiment, the strut connectors can be welded to the struts, or the struts could include extensions that weld directly to the other struts, with each extension including the strut interlocks (see below) to allow interlocking of two or more base frame elements. Such an arrangement would integrate the functionality of the strut connectors 102, 104, 106, and 108 directly into the struts themselves, making separate strut connectors unnecessary.

The strut connectors 102, 104, 106, and 108 in FIG. 1A include two types: two outset strut connectors 102 and 104 and two inset strut connectors 106 and 108. The outset strut connectors 102 and 104 each have an outset strut interlock 103 and 105. In the embodiment shown in FIG. 1A, the outset strut interlocks 103 and 105 comprise strong magnets (such as neodymium magnets) that protrude from the front face of the outset strut connectors 102 and 104 and are designed to join with the inset strut interlocks 107 and 109 on the inset strut connectors 106 and 108, respectively. Although the inset strut interlocks 107 and 109 are not visible in FIG. 1A, their locations are referenced in FIG. 1A (see FIG. 2A for an illustration thereof). The inset strut interlocks 107 and 109 are inset ports that receive the protruding outset strut attachments 103 and 105 from a second base frame element and interlock with them via strong magnets of their own to removably attach the two base frame elements to one another. In other embodiments, the base frame elements can be modified slightly (e.g., angled connector faces on the strut connectors and inset/outset struts) so that three base frame elements can be attached to one another to form a triangle, five can form a pentagon, six a hexagon, seven a heptagon, eight an octagon, nine a nonagon, ten a decagon, etc.

The magnets used in the instant invention are not simply replacement attachment means. Instead, they offer a number of large advantages over prior art attachment devices. For example, the prior art often utilizes dovetail shaped slide or snap in components which can be difficult to attach to one another, and are prone to becoming misshapen such that they no longer mate. Additionally, extremely tight manufacturing tolerances are necessary for such connectors in order for the resulting join to hold tightly and yet allow a user to easily assemble and disassemble the components. Other connectors such as Velcro® eventually wear out after being repeatedly attached and detached and can also be difficult to assemble. Common connectors used in the art lose strength and need to be replaced, not the case with the magnets of the present invention. Hinges with hinge pins are known in the art and besides wearing out, they can be bent out of shape, have lost pins, or otherwise become difficult, if not impossible, to use. Additionally, the inset/outset design of the present invention allows the components to be attached together in less than a second, with relatively loose tolerances such that even a novice can assemble components quickly and easily.

Each of the struts 110, 120, 130, and 140 has a plurality of channel members. For example, the inset side strut 110 has an inset interior channel member 112 shown in FIG. 1A. Similarly, the outset side strut 120 has an outset interior channel member 122. The top strut 130 has a top interior channel member 132 and the bottom strut 140 has a bottom interior channel member 142. The interior channel members 112, 122, 132, and 142 can abut one another when the struts 110, 120, 130 and 140 are attached to each other as shown in FIG. 1A. This arrangement adds support and strength to the resulting base frame element 100. In other embodiments, the interior channel members 112, 122, 132, and 142 may or may not abut one another when assembled. Additionally, each strut 110, 120, 130, and 140 can have a plurality of interior channel members, although only one is shown for each strut in FIG. 1A (see FIG. 6 for an example illustrating two interior channel members).

Although not illustrated in FIG. 1A, an interlocking panel may be attached to one or more of the interior channel members 112, 122, 132, and 142. See FIG. 4 for an illustration of an interlocking panel 200 being used in another way: to strengthen and interlock four base frame elements (as opposed to strengthening and interlocking the struts that make up a single base frame element). However, the same application and functionality shown in FIG. 4 can obviously be applied to interlock the struts in a single base frame element.

In addition to the interior channel members 112, 122, 132, and 142, each strut 110, 120, 130 and 140 can have a plurality of exterior channel members. In FIG. 1A, the top strut 130 is illustrated with a first top exterior channel member 135 and a second top exterior channel member 137. Similarly, the bottom strut 140 is illustrated with a first bottom exterior channel member 145 and a second bottom exterior channel member 147. The exterior channel members 135, 137, 145, and 147 extend outwards from the front face of the base frame element 100 towards the viewer and so are difficult to perceive in FIG. 1A (see FIGS. 2A, 2B, and 6 for a more complete understanding thereof). The exterior channel members are similar in shape and function to the interior channel members as they allow for the attachment of interlock panels to the system in order to form the components of the system into furniture pieces and to strengthen and enhance the functionality of those pieces. For additional possible functionality of the exterior channel members see FIGS. 5 and 6 and the accompanying Detailed Descriptions thereof).

Figure 1B:
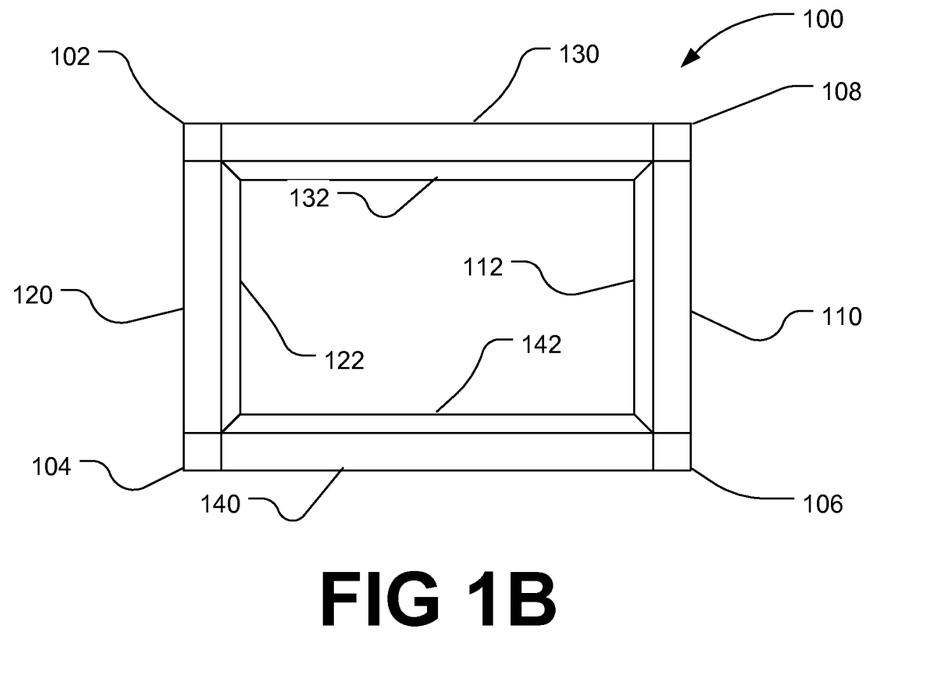
FIG. 1B illustrates a rear elevation view of an exemplary embodiment of a base frame element of an element modular furniture system.

FIG. 1B illustrates a rear elevation view of an exemplary embodiment of a base frame element 100 of an element modular furniture system. The base frame element 100 shown in FIG. 1B illustrates a subset of the same sub-components as FIG. 1A, including: an inset side strut 110, an outset side strut 120, a top strut 130 and a bottom strut 140. Each strut is joined to two neighboring struts in order to form the four-sided base frame element 100 illustrated in FIG. 1B: the top strut 130 is attached via the outset strut connector 102 to the outset strut 120, the outset strut 120 is attached via the outset strut connector 104 to the bottom strut 140, the bottom strut 140 is attached via the inset strut connector 106 to the inset strut 110, and the inset strut 110 is attached via the inset strut connector 108 to the top strut 130.

As detailed in FIG. 1A and described above, each of the struts 110, 120, 130, and 140 has a plurality of channel members. Those illustrated in FIG. 1B include: an inset interior channel member 112 attached to the inset strut 110; an outset interior channel member 122 attached to the outset strut 120; a top interior channel member 132 attached to the top strut 130; and a bottom interior channel member 142 attached to the bottom strut 140.

Figure 2A:
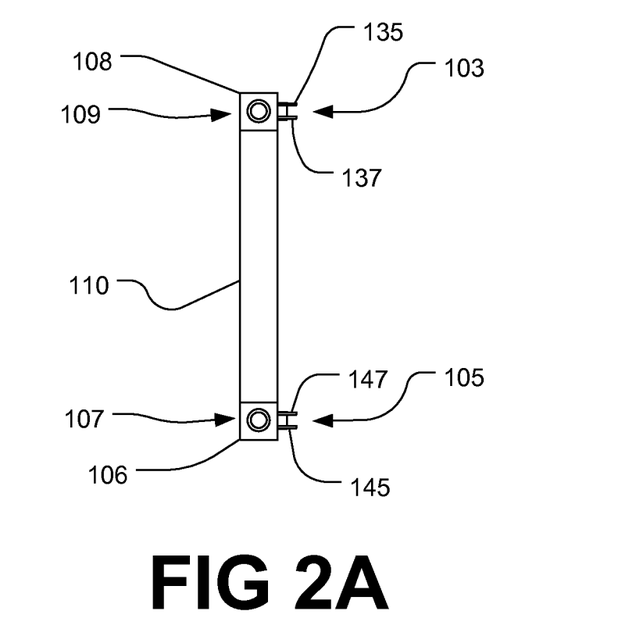
FIG. 2A illustrates a left side elevation view of an exemplary embodiment of a base frame element of an element modular furniture system.

FIG. 2A illustrates a left side elevation view of an exemplary embodiment of a base frame element 100 of an element modular furniture system. In this embodiment, the left side comprises the inset side of the base frame element 100. Thus, the inset strut 110 is visible as are the inset strut connectors 108 and 106. Note that the inset strut interlocks 107 and 109 are shown in FIG. 2A. The inset strut interlocks 107 and 109 each comprise an inset port for receiving therein the outset strut interlocks from another base frame element. Resident inside each inset port is a strong magnet that can attract and hold the corresponding magnet of the outset strut interlocks. In the embodiment of FIG. 2A, the magnets are cylindrical in shape, other shapes are contemplated.

Also shown in FIG. 2A are the first top exterior channel member 135 and the second top exterior channel member 137 that extend out from the top strut. Note that the outset strut interlock 103 is just visible behind the exterior channel members 135 and 137. Similarly, the first bottom exterior channel member 145 and the second bottom exterior channel member 147 are also illustrated in FIG. 2A as is the second outset strut interlock 105.

Figure 2B:
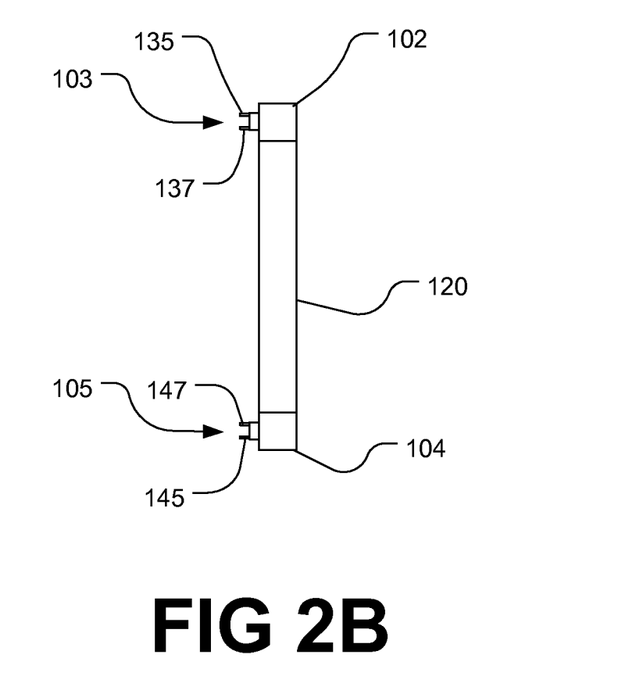
FIG. 2B illustrates a right side elevation view of an exemplary embodiment of a base frame element of an element modular furniture system.

FIG. 2B illustrates a right side elevation view of an exemplary embodiment of a base frame element 100 of an element modular furniture system. In this embodiment, the right side comprises the outset side of the base frame element 100. Thus, the outset strut 120 is visible as are the outset strut connectors 102 and 104. Note that the outset strut interlocks 103 and 105 are shown in FIG. 2B.

Also shown in FIG. 2B are the first top exterior channel member 135 and the second top exterior channel member 137 that extend out from the top strut. Similarly, the first bottom exterior channel member 145 and the second bottom exterior channel member 147 are also illustrated in FIG. 2B.

Taking FIGS. 1A, 1B, 2A, and 2B together, it should be apparent that the base frame element 100 illustrated therein is generally flat and rectangular in shape. In other embodiments, other shapes are contemplated and can be constructed without departing from the scope of the invention.

Figure 3:
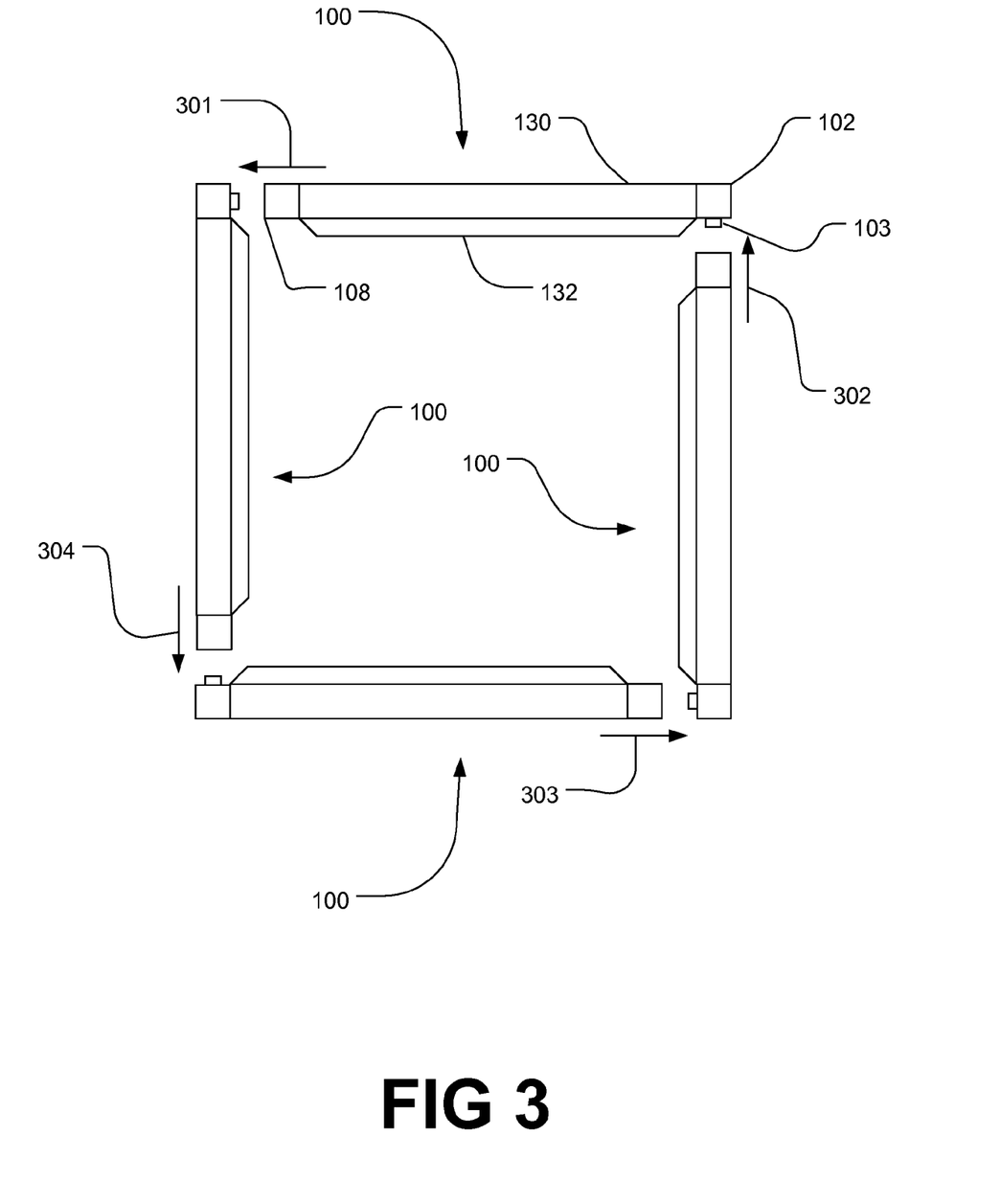
FIG. 3 illustrates a top plan view of an exemplary embodiment of four base frame elements of an element modular furniture system.

FIG. 3 illustrates a top plan view of an exemplary embodiment of four base frame elements 100 of an element modular furniture system. As the four base frame elements 100 are similar, only one includes reference numbers for its subcomponents for clarity. The illustrated subcomponents include the top strut 130, the outset strut connector 102, the outset strut interlock 103, the inset strut connector 108 and the top interior channel member 132.

FIG. 3 illustrates the process of connecting four base frame elements 100 to form a four sided furniture structure. The four base frame elements 100 are each moved in the direction shown by the four interlock direction arrows 301, 302, 303, and 304 until the outset strut interlocks 103 fit within the corresponding ports in the inset strut connectors 108. The magnets within each strongly attract each other and subsequently hold each base frame element 100 to its neighbors with a strong connection. Additional strength can be added to the resulting furniture structure via the introduction of an interlocking panel like that seen in FIG. 4.

Figure 4:
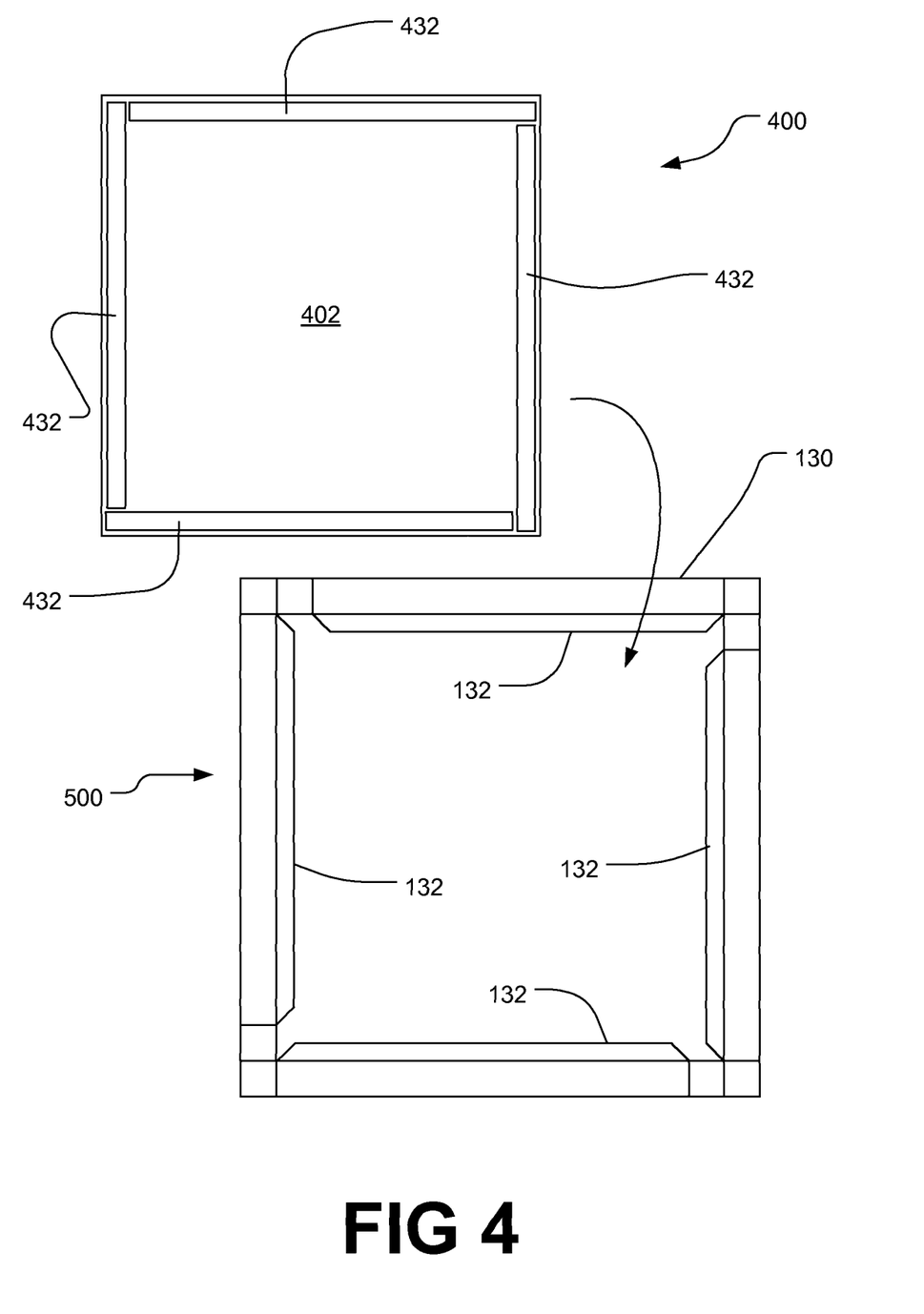
FIG. 4 illustrates a top plan view of an exemplary embodiment of four base frame elements of an element modular furniture system assembled together with a top interlocking panel.

FIG. 4 illustrates a top plan view of an exemplary embodiment of four base frame elements of an element modular furniture system assembled together with a top interlocking panel 400. The top interlocking panel 400 comprises a panel 402 and a plurality of panel attachment means 432.

In order to assemble a simply furniture structure, four base frame elements can be attached together as detailed in FIG. 3 and the accompanying descriptions. The top interlocking panel 400 can be placed on the four top interior channel members 132 with the plurality of panel attachment means 432 engaging the top interior channel members 132. In one embodiment, improved reclosable fasteners (such as 3M™ Dual Lock™ reclosable fasteners) are attached to the top interlocking panel 400 as the panel attachment means 432 as well as to the top interior channel members 132. When the reclosable fastener materials come together, the top interlocking panel 400 is thereby interlocked with the top interior channel members 132. In another embodiment, the placement of reclosable fasteners can be alternated such that the top interlocking panel 400 will only interlock with the top interior channel members 132 if oriented correctly. Once the top interlocking panel 400 is emplaced within the furniture structure, the base frame elements can no longer be moved out of position by squeezing the otherwise square shape of the lower structure in FIG. 4 into a non-rectangular parallelogram.

The reclosable fasteners provide a huge advantage over the prior art screws, rivets, and bolts since they allow quick assembly and disassembly and do not have the sharp protrusions of those common fasteners.

The top interlocking panel 400, thus provides a large degree of strength and stability to the furniture structure. The panel 400 can be acrylic, metal, or any other suitable material. Additionally, the material can be transparent, translucent, or opaque (or a combination thereof) so that lighting accents can be added to the furniture structure. By replacing at least some of the reclosable fastener attachment means 432 with hinges, a door can be created (see FIG. 5). The side face of the furniture structure in FIG. 4 is referenced by the face arrow 500. That is the face of the furniture structure shown in FIG. 5.

Figure 5:
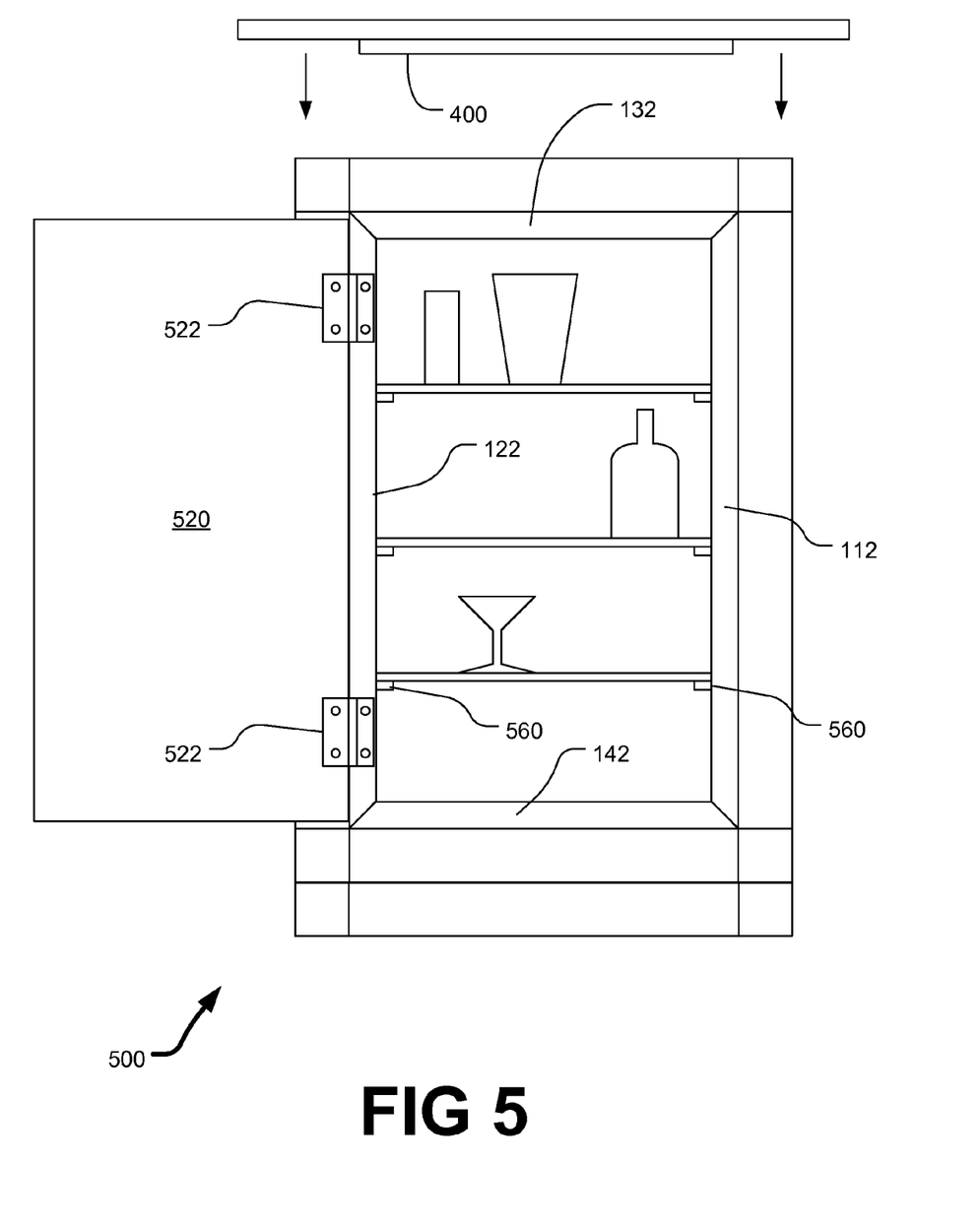
FIG. 5 illustrates a front elevation view of another exemplary embodiment of four base frame elements of an element modular furniture system assembled together with a top interlocking panel.

FIG. 5 illustrates a front elevation view of another exemplary embodiment of four base frame elements of an element modular furniture system assembled together with a top interlocking panel 400. Attached above the top interlocking panel 400 is a bar top component 450. In another embodiment, other types of add-on surface structures can be attached to, or incorporate therein, a top interlocking panel 400.

The face of the furniture structure shown in FIG. 5 is a single base frame element such as that shown in FIG. 1B. The interior channel members 112, 122, 132, and 142 would often have an interlock panel attaching them together. However, in this embodiment, the interlock panel is replaced with a door 520. The door 520 utilizes hinges 522 that attach the door to the outset interior channel member 122. Inside the furniture structure illustrated in FIG. 5 is a plurality of shelves. The shelves are illustrated holding a number of bar-related items such as glasses and bottles. The shelves can be supported within the furniture structure by shelf locks 560. For clarity, only one set of shelf locks 560 are labeled. The shelf locks can attach to either or both of the interior channel members and exterior channel members.

FIG. 6 illustrates a cross-section view of a frame strut component 101 used in an element modular furniture system. As described above, the struts 110, 120, 130, and 140 can be tubular in construction as illustrated in FIG. 6. This type of construction allows for rigidity while substantially reducing the weight. Also illustrated in FIG. 6 are a plurality of interior channel members 132 and 133 and a plurality of exterior channel members 135 and 137. The channel members can provide attachment points for interlock panels, doors, lights, shelves, shelf locks, etc. Additionally, they strengthen the struts themselves. As illustrated in FIG. 6, the number of both types of channel members is two. In other embodiments, the number can be one, two, three, or more and it can vary between types.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of the invention can be modified, if necessary, to employ the systems, functions, and concepts of the various references to provide yet further embodiments of the invention.

In light of the above "Detailed Description," the Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The above specification, examples and data provide a description of the structure and use of exemplary implementations of the described articles of manufacture and methods. It is important to note that many implementations can be made without departing from the spirit and scope of the invention.

What is claimed is:

1. An element modular furniture system, comprising:
   a plurality of base frame elements, each base frame element comprising:
   an inset strut, an outset strut, a top strut, and a bottom strut, wherein the struts comprise elongate members, each extending generally straight from a first end to a second end;
   a plurality of strut connectors, each shaped so as to join one strut to another at approximately ninety degrees, the plurality of strut connectors comprising at least a first outset strut connector, a second outset strut connector, a first inset strut connector, and a second inset strut connector;
   the first end of the top strut attaching via the first inset strut connector to the second end of the inset strut, the first end of the inset strut attaching via the second inset strut connector to the second end of the bottom strut, the first end of the bottom strut attaching via the second outset strut connector to the second end of the outset strut, and the first end of the outset strut attaching via the first outset strut connector to the second end of the top strut;
   wherein each of the struts is connected such that the base frame element formed thereby extends in a single plane;
   the first outset strut connector having a first outset strut interlock protruding from a first front face of the first outset strut connector and comprising a first magnet;
   the second outset strut connector having a second outset strut interlock protruding from a second front face of the second outset strut connector and comprising a second magnet;
   the first inset strut connector having a first inset port recessed in a side surface of the first inset strut connector containing a third magnet and shaped so the first inset port receives the first outset strut interlock of an adjacent one of said plurality of base frame elements;
   the second inset strut connector having a second inset port recessed in a side surface of the second inset strut connector containing a fourth magnet and shaped the second inset port receives the second outset strut interlock of an adjacent one of said plurality of base frame elements;
   wherein each of the struts has at least one interior channel member attached thereto and extending lengthwise between the first end and second end of each strut on an interior face thereof, said interior channel members configured to removably attach to one of a plurality of base frame element interlock panels;
   wherein each of the plurality of base frame elements can attach to another base frame element by inserting the outset strut interlocks of one base frame element into the inset strut interlocks of another base frame element;
   a plurality of exterior channel members, wherein each base frame element has at least one exterior channel member attached to one of the plurality of struts within said base frame element, said exterior channel member extending out of the plane containing said base frame element;
   a furniture piece interlock panel configured so that said panel can removably attach to the plurality of exterior channel members using a plurality of panel attachment means, and wherein said interlocking panel comprises a generally flat member shaped so as to fit within a space bounded by the plurality of base frame elements.

2. The element modular furniture system of claim 1, wherein the number of base frame elements is three and the outset strut interlocks of a first base frame element are inserted into the inset strut interlocks of a second base frame element, the outset strut interlocks of the second base frame element are inserted into the inset strut interlocks of a third base frame element, and the outset strut interlocks of the third base frame element are inserted into the inset strut interlocks of the first base frame element in order to form a three-sided furniture piece.

3. The element modular furniture system of claim 2, wherein the struts are tubular in cross section.

4. The element modular furniture system of claim 2, wherein each top strut has two interior channel members extending in parallel to each other.

5. The element modular furniture system of claim 2, wherein the furniture piece interlock panel is made from acrylic.

6. The element modular furniture system of claim 2, wherein the panel attachment means is a reclosable fastener.

7. The element modular furniture system of claim 1, wherein the number of base frame elements is four and the outset strut interlocks of a first base frame element are inserted into the inset strut interlocks of a second base frame element, the outset strut interlocks of the second base frame element are inserted into the inset strut interlocks of a third base frame element, the outset strut interlocks of the third base frame element are inserted into the inset strut interlocks of a fourth base frame element, and the outset strut interlocks of the fourth base frame element are inserted into the inset strut interlocks of the first base frame element in order to form a four-sided furniture piece.

8. The element modular furniture system of claim 7, wherein the struts are tubular in cross section.

9. The element modular furniture system of claim 7, wherein each top strut has two interior channel members extending in parallel to each other.

10. The element modular furniture system of claim 7, wherein the furniture piece interlock panel is made from acrylic.

11. The element modular furniture system of claim 7, wherein the panel attachment means is a reclosable fastener.

12. The element modular furniture system of claim 1, wherein the number of base frame elements is selected from five, six, seven, eight, nine, and ten in order to form a furniture piece having five, six, seven, eight, nine and ten sides, respectively.

13. The element modular furniture system of claim 12, wherein the struts are tubular in cross section.

14. The element modular furniture system of claim 12, wherein each top strut has two interior channel members extending in parallel to each other.

15. The element modular furniture system of claim 12, wherein the furniture piece interlock panel is made from acrylic.

16. The element modular furniture system of claim 12, wherein the panel attachment means is a reclosable fastener.

17. The element modular furniture system of claim 1, wherein the struts are tubular in cross section.

18. The element modular furniture system of claim 1, wherein each top strut has two interior channel members extending in parallel to each other.

19. The element modular furniture system of claim 1, wherein the furniture piece interlock panel is made from acrylic.

20. The element modular furniture system of claim 1, wherein the panel attachment means is a reclosable fastener.

\* \* \* \* \*